UNITED STATES PATENT OFFICE.

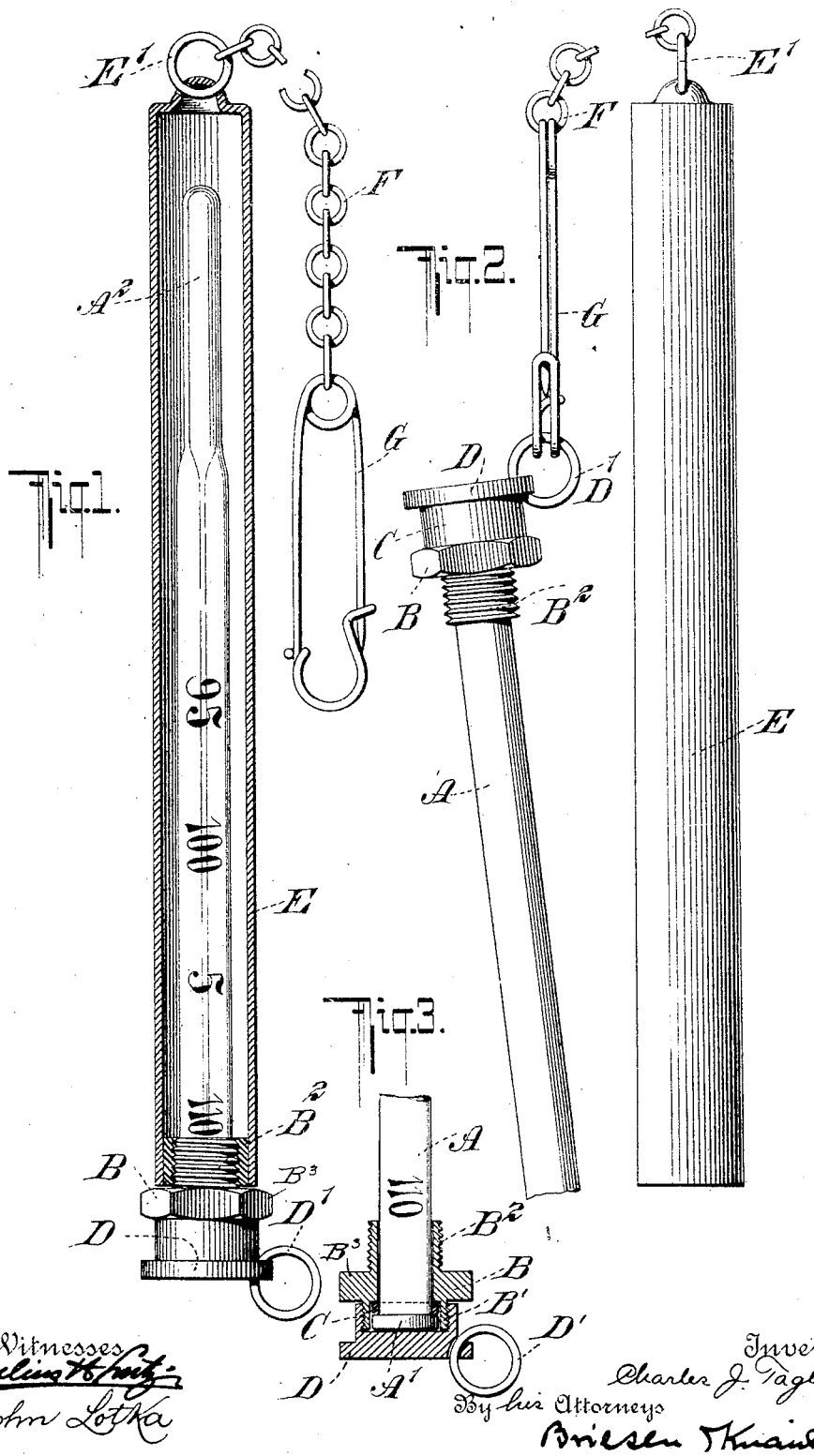

CHARLES J. TAGLIABUE, OF BROOKLYN, NEW YORK.

THERMOMETER.

No. 803,639.        Specification of Letters Patent.        Patented Nov. 7, 1905.

Application filed October 6, 1904. Serial No. 227,334.

*To all whom it may concern:*

Be it known that I, CHARLES J. TAGLIABUE, a citizen of the United States, and a resident of Brooklyn, county of Kings, city and State of New York, have invented certain new and useful Improvements in Thermometers, of which the following is a specification.

My invention relates to clinical thermometers, and has for its object to provide a simple and efficient means for securing said thermometers in a protecting-case.

Other objects of my device will appear from the detailed description following hereinafter, and the features of novelty will be pointed out in the appended claims.

Reference is to be had to the accompanying drawings, in which—

Figure 1 is an elevation, partly in section, of a thermometer with my invention applied thereto. Fig. 2 is a view illustrating another position of the thermometer, and Fig. 3 is a detail section of the means for securing the end of the thermometer in the fastening device.

A represents a thermometer of any approved construction, which is provided with a bead $A'$ at the end opposite to the bulb $A^2$.

B is a thimble which is slipped over the thermometer and is provided with a polygonal flange $B^3$, and C is a washer of rubber or any other suitable material which is placed between the head $A'$ of the thermometer and the thimble B. The said thimble B is provided with a downwardly-projecting portion $B'$, which is screw-threaded to receive a nut or cap D, this nut or cap D serving to firmly secure the end of the thermometer in the thimble B. A ring or eye $D'$ is secured to the cap D for purposes which will be more fully described hereinafter. The thimble B is further provided with an upwardly-projecting portion $B^2$, which is also screw-threaded and which is arranged to be screwed into the protecting-case E when the thermometer is not in use, said case being provided with a mating screw-thread at its open end for this purpose. The protecting-case E is provided at its closed end with a ring or eye $E'$, to which is attached one end of a chain F. To the other or free end of the chain is secured a fastening device G, such as a safety-pin, which may be fastened to the garment of the user of the thermometer to prevent the case and thermometer from being mislaid.

Another and important use of the chain and fastening device will now be described. After the physician or other person has used the thermometer to take a temperature and it is desired to return the mercury to the bulb the safety-pin or other device G is first unfastened from the garment of the user and then connected with the ring $D'$ of the cap D, as clearly shown in Fig. 2. The case E is then firmly grasped in the hand of the physician or other person and the thermometer rapidly whirled around in a circle a few times, whereupon it will be found that the mercury has been completely returned to the bulb by centrifugal force. This device thus does away with the danger of breaking the thermometer by the common way of returning the mercury to the bulb—as, for instance, by striking the hand holding the thermometer upon the knee or other object or rapidly moving the thermometer in the air with a sort of striking or jerky movement. My invention also overcomes the disadvantages resulting from fastening one end of the thermometer in a cap or thimble with sealing-wax, as is the usual custom.

With a fastening device constructed according to my invention there is no danger of the thermometer becoming loose in the cap by the softening of the sealing-wax or other fastening medium, the nut or cap D serving to firmly secure the parts together.

My device also has the material advantage of being very easily taken apart and put together again, it being only necessary to unscrew the cap D and slip the thimble B over the thermometer, the reverse operation taking place when it is desired to reassemble the parts.

Various modifications may be made without departing from the nature of my invention.

I claim and desire to secure by Letters Patent—

1. The combination with a thermometer, of a tubular securing device through which said thermometer is arranged to project, said securing device being provided with a flange, a cap adapted for engagement with the securing device on one side of the flange against which said cap abuts, for securing said device and the thermometer together, and a protecting-case into which the thermometer is adapted to be inserted when not in use, said case being arranged to engage the securing device, on the other side of said flange against which said case abuts when in position.

2. The combination with a thermometer having a bead at one end, of a thimble adapted to be slipped on the thermometer and having its bore enlarged at one end to receive said bead, both ends of the thimble being screw-threaded, a washer contained between the bead and the thimble, a cap screwed on one end of the thimble and engaging the beaded end of the thermometer, and a case screwed on the other end of the thimble.

3. The combination of a thermometer, a case therefor, a flexible member connected with said case at the end opposite to that at which the thermometer enters said case and an attaching device for securing said flexible member to the thermometer opposite to the bulb.

In testimony whereof I have signed my name to this specification in the presence of two subscribing witnesses.

CHARLES J. TAGLIABUE.

Witnesses:
 JOHN LOTKA,
 JOHN A. KEHLENBECK.